United States Patent
Ding

(10) Patent No.: US 9,625,099 B2
(45) Date of Patent: Apr. 18, 2017

(54) PRESSURE REDUCING SYSTEM BY CASCADE PRESSURE STEP DOWN

(71) Applicant: Clean Energy Fuels Corp., Newport Beach, CA (US)

(72) Inventor: Denis Ding, Riverside, CA (US)

(73) Assignee: Clean Energy Fuels Corp., Newport Beach, CA (US)

( * ) Notice: Subject to any disclaimer, the term of this patent is extended or adjusted under 35 U.S.C. 154(b) by 64 days.

(21) Appl. No.: 14/694,413

(22) Filed: Apr. 23, 2015

(65) Prior Publication Data

US 2016/0312955 A1    Oct. 27, 2016

(51) Int. Cl.
*F17C 7/04*      (2006.01)
*G05D 16/04*   (2006.01)
*F17C 13/04*    (2006.01)

(52) U.S. Cl.
CPC ............... *F17C 7/04* (2013.01); *F17C 13/04* (2013.01); *G05D 16/04* (2013.01); *F17C 2221/033* (2013.01)

(58) Field of Classification Search
CPC ...... F17C 2221/033; F17C 7/04; F17C 13/04; F17C 2205/0138; B60K 2015/062; B60K 15/06

USPC .............................. 137/485, 487.5, 571, 572
See application file for complete search history.

(56) References Cited

U.S. PATENT DOCUMENTS

| | | | | |
|---|---|---|---|---|
| 5,454,408 A | * | 10/1995 | DiBella | ................. F04B 9/1176 141/18 |
| 6,953,045 B2 | * | 10/2005 | Enerson | .................... F17C 5/06 137/14 |
| 2011/0303299 A1 | * | 12/2011 | Martens | ................. C12M 21/04 137/12 |

* cited by examiner

*Primary Examiner* — Michael R Reid
*Assistant Examiner* — Paul J Gray
(74) *Attorney, Agent, or Firm* — Sheppard, Mullin, Richter & Hampton LLP

(57) ABSTRACT

A system and method for reducing the pressure of a pressurized gas is provided, the system including a pressure reduction stage, the pressure reduction stage including: a knock-out bottle; a control valve connected to a gas stream inlet and configured to introduce a gas stream at an initial pressure level into the knock-out bottle; an output connected to a gas stream outlet; and a pressure sensor for monitoring the pressure within the knock-out bottle and changing the operational state of the control valve to maintain the pressure inside the knock-out bottle within a pressure range. More than one pressure reduction stage may be implemented in series to provide a more gradual step down in the gas pressure.

12 Claims, 3 Drawing Sheets

PRESSURE REDUCING SYSTEM BY CASCADE PRESSURE STEP DOWN

TECHNICAL FIELD

The disclosed technology relates generally to pressure reduction of compressed natural gas (CNG), and more particularly, some embodiments relate to non-thermal pressure reducing systems.

DESCRIPTION OF THE RELATED ART

The use of natural gas as a fuel source continues to grow around the world. Natural gas combustion produces less harmful and undesirable byproducts than gasoline or other petroleum-based products, and is safer than other fuels in the event of a spill because it disperses quickly in air. Natural gas transportation is generally done in three different methods: pipeline, LNG (Liquefied Natural Gas) in cryogenic trailers, or CNG (Compressed Natural Gas) in tube trailers.

When CNG is transported with tube trailers, it is conventionally compressed, stored and transported at a high pressure. The actual pressure allowable varies by jurisdiction (federal and/or local) and equipment design specifications, but it could be up to 4,000 pounds per square inch (psig). On the filling end, sometimes called the 'mother station', gas supplied by a pipeline is compressed onto the tube trailers by one or more compressors. When the tube trailer reaches its target pressure, it is disconnected from the mother station and travels to its destination. At the destination, when the end-user equipment is not designed to utilize CNG at the transport pressure, the CNG must be depressurized before transferring to the end-users, such as the local gas utilities, power generators, or boilers. A pressure reducing system (PRS) is normally used to perform the de-pressurization, that is, to reduce the pressure of the CNG to a safe and usable pressure.

Most conventional PRS designs utilize a heater system in combination with one or more pressure regulators. Pressure regulators restrict the flow of the CNG through the use of an orifice. When CNG is depressurized, the temperature of the CNG decreases. At colder temperatures, water and liquid hydrocarbons can condense, or "dew out," of the CNG. This can result in operation and maintenance problems with the regulators, instrumentations and valves, as well as downstream issues with the end-user's equipment.

Most PRSs utilize a heating system prior to passing the gas through one or more pressure regulators. By heating the CNG, the dew point of the CNG stream is increased, minimizing the amount of liquid dropout caused by the temperature drop associated with depressurization. A variety of heating systems have been utilized in conventional PRSs, including electric heaters, catalytic heaters, hot water heaters, hot oil heaters, and heated glycol systems, to name a few. However, most of these heating systems require regular maintenance and often fail to sufficiently raise the temperature of the CNG stream to avoid liquid dropout where the CNG contains a high level of heavy hydrocarbons and water vapor.

BRIEF SUMMARY OF EMBODIMENTS

According to various embodiments of the disclosed technology, a high pressure gas stream is depressurized without the need for pre-heating the gas or the use of restrictive pressure regulators. Without using the pressure regulators or restrictive orifices, the pre-heating process can be eliminated. Flow control is obtained using pressure reduction stages, where the pressure of the gas stream is stepped down gradually until it reaches a usable pressure level. Liquid dropout are controlled using knock-out vessels or bottles in each pressure reduction stage, where any liquid dropout is collected in the knock-out bottle while lower-pressure gas stream continues on through the system. Control valves and pressure sensors are used to maintain the gas pressure within a pre-designed range of within the knock-out bottles in each pressure reduction stage.

According to embodiments of the disclosed technology, a system for reducing the pressure of a pressurized gas stream is provided. The system introduces a gas stream at an initial pressure level into one or more pressure reduction stages. The one or more pressure reduction stages include a knock-out bottle connected to a control valve, and a pressure sensor for monitoring the pressure within the knock-out bottle. The pressure sensor and the control valve work together to maintain the gas pressure inside the knock-out bottle within a particular pressure range. When the pressure reaches or dips below the low end of the range, the pressure sensor signals the control valve to enter an open state, allowing more gas to enter the knock-out bottle. When the pressure reaches or exceeds the high end of the range, the pressure sensor signals the control valve to enter a closed state, stopping the flow of the gas stream into the knock-out bottle. Depending on the design of the system, multiple pressure reduction stages may be placed in series, to enable a gradual reduction in the gas pressure of a gas stream without the need for pressure regulators or pre-heating.

According to an embodiment of the disclosed technology, a method of reducing the pressure of a pressurized gas is provided. The method includes introducing a high pressure gas stream into a knock-out bottle through a control valve. The pressure within the knock-out bottle is monitored to ensure that the gas pressure inside the knock-out bottle remains within a certain pressure range. The pressure range inside the knock-out bottle is lower than the initial pressure of the gas stream. By changing the operational state of the control valve—placing it in either the open or closed position—the pressure range inside the knock-out bottle may be maintained. Multiple knock-out bottles, with their own control valves and monitoring capabilities, may be utilized, where the pressure range within each successive knock-out bottle is lower than the pressure of the entering gas stream.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of the technology described herein, which are defined solely by the claims attached hereto.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

The figures are not intended to be exhaustive or to limit the technology to the precise form disclosed. It should be understood that the technology can be practiced with modification and alteration, and that the disclosed technology be limited only by the claims and the equivalents thereof.

DETAILED DESCRIPTION OF THE EMBODIMENTS

Embodiments of the technology disclosed herein is directed toward a systems and methods for reducing the pressure of a pressurized gas. More particularly, the various embodiments of the technology disclosed herein relate to pressure reducing systems (PRSs) that reduce the pressure of a pressurized gas without the need for pre-heating of the gas or the use of pressure regulators.

Figure 1:
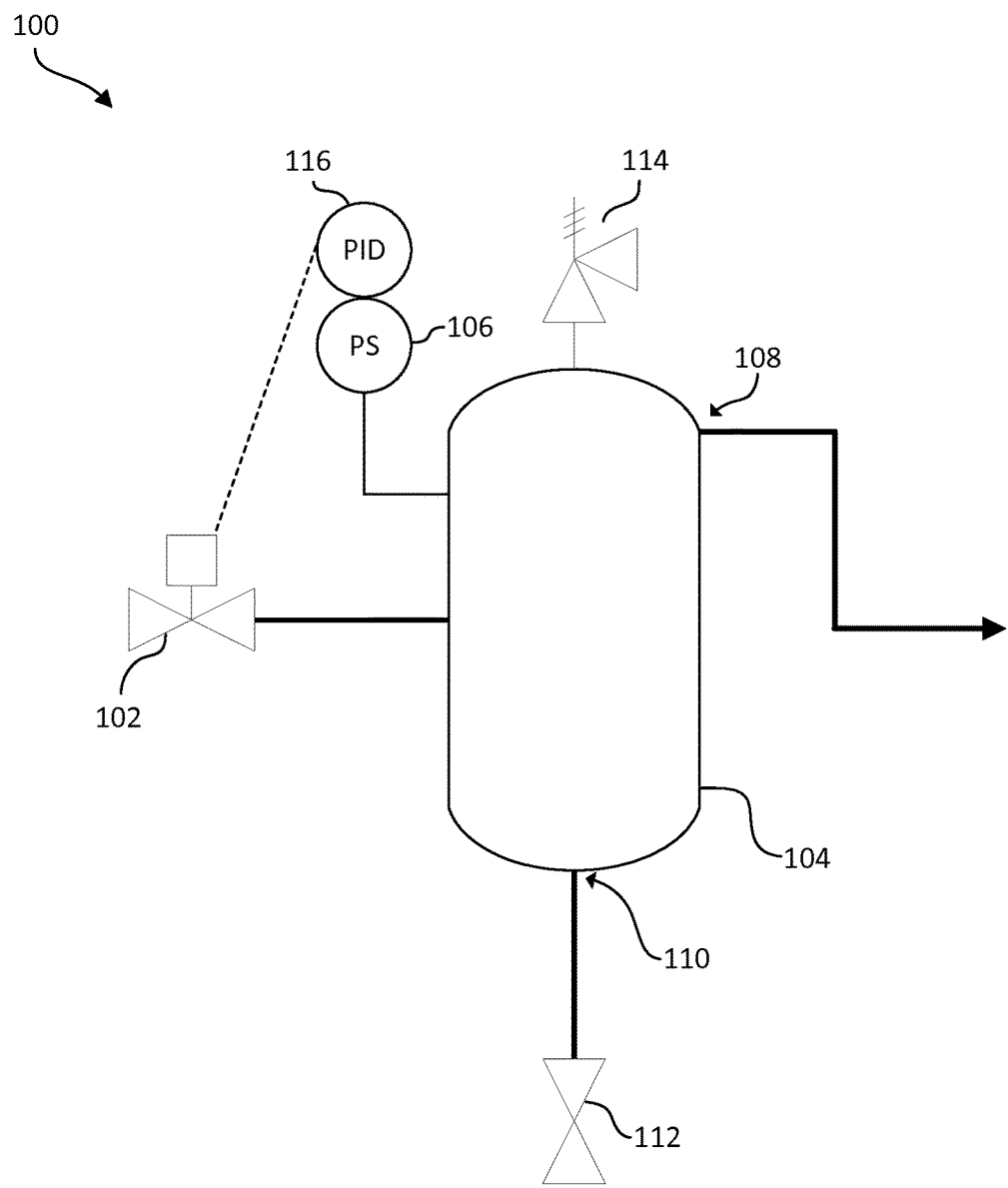
FIG. 1 is a diagram of an example embodiment of a pressure reducing system in accordance with the present disclosure.

This technology takes advantage of the benefits of controlled depressurization of a high pressure gas, such as compressed natural gas (CNG), through the use of pressure reduction stages. FIG. 1 illustrates an example pressure reduction stage that may be implemented in a pressure reducing system in accordance with the present disclosure. The pressure reduction stage 100 includes a control valve 102, a knock-out bottle 104, and one or more pressure sensors 106. The control valve 102 is connected to an input of the knock-out bottle 104 to introduce a stream of CNG into the knock-out bottle 104. In some embodiments, the source of the CNG may be a connection with a compression station. In other embodiments, the CNG may come from one or more tube trailers. In various embodiments, a combination of both a connection to the compression station and tube trailers may provide the source of the CNG passing through the control valve 102.

The knock-out bottle 104 (also known as a knock-out tank, knock-out drum, or flash drum) is a vapor-liquid separator component used in various industries where mixtures of vapor and liquid are present, such as the gas and oil industry. In the example pressure reduction stage 100, the temperature of the gas stream entering the knock-out bottle 104 drops. When the temperature drops below the dew point of water or one of the various hydrocarbons, the water or hydrocarbons will condense out of the gas stream. The resulting liquid water or hydrocarbons will settle at the bottom of the knock-out tank 104. This lower-pressure gas stream may then continue through the system via the outlet 108 of the knock-out bottle 104.

The liquid that condenses out of the gas inside the knock-out bottle 104 must be removed occasionally to ensure that the knock-out bottle 104 operates properly. A drain 110 may be included on the knock-out bottle 104 to allow the condensate and other liquid to drain out of the knock-out bottle 104. In various embodiments, the drain 110 may be connected to a valve 112, as illustrated in PRS 100. In various embodiments, the valve 112 may be one of: a check valve; a gate valve; a butterfly valve; a powered valve; a control valve; a diaphragm valve; a ball valve; a plug valve; or any other valve suitable for high pressure flows to pass through. In various embodiments, the drain 110 may operate automatically or on a timed basis. In some embodiments, the knock-out bottle 104 may include a liquid float or other level sensor to trigger the drain 110 to remove the liquid leftover when it reaches a certain level. The knock-out bottle 104 may also include a relief valve 114, to allow the release of gas in the event the pressure rises too quickly within the knock-out bottle 104.

The pressure within the knock-out bottle 104 of the PRS 100 may be maintained within a pressure range below that of the initial pressure of the incoming gas stream. To maintain the pressures inside the knock-out bottle 104, a pressure sensor (PS) 106 is connected to the knock-out bottle 104. In various embodiments, more than one PS 106 may be implemented. The use of multiple pressure sensors provides a redundancy check to ensure that an accurate reading is obtained.

When the pressure inside the knock-out bottle 104 is within a desired pressure range, the control valve 102 remains in a closed position. If the control valve 102 was open, additional CNG at the higher pressure could enter the knock-out bottle 104, raising the pressure inside the knock-out bottle 104. When the pressure inside the knock-out bottle drops to or below the low end of the pressure range, the control valve 102 is opened to allow high pressure CNG to enter the knock-out bottle 104 and raise the pressure inside the tank. When the pressure inside the knock-out bottle 104 rises to or above the high end of the range, the control valve 102 is closed to stop the flow of high pressure CNG into the knock-out bottle 104. Through this process, the pressure range within the knock-out bottle 104 can be maintained.

The identification of the particular pressure range for a knock-out bottle 104 depends on the design of the system. The pressure ranges are designed to bring the CNG down to a lower pressure than it is when it enters the system via a high pressure gas connection. In systems that utilize multiple pressure reduction stages 100 in accordance with the present disclosure, more intermediate pressure ranges may be utilized in successive pressure reduction stages 100 to gradually step the CNG down to a usable pressure at a system outlet. In some embodiments where only one pressure reduction stage is used, the pressure range can be chosen to ensure that CNG at a usable pressure may be obtained at the outlet of the system. In some embodiments, additional control valves, or pressure regulators, may be utilized at the outlet of the PRS in accordance with the present disclosure.

The PS 106 may alert a PRS technician as to a pressure condition within the knock-out bottle 104 requiring a change in the operational condition of the control valve 102. In various embodiments, the PS 106 may communicate with an electronic controller, such as a proportional-integral-derivative (PID) controller 116 or a PLC (programmable logic controller). Such controllers are widely utilized in industrial processes to monitor production processes and adjusting the process based on changes, or "errors," in the process. In some embodiments, the PID controller 116 could be implemented within the PS 106. The PID controller 116 can send control messages to the control valve 102 to change the operational condition of the control valve 102. When the pressure inside the knock-out bottle 104 drops to or below the low end of the pressure range as detected by the PS 106, the PID controller 116 may send a command message to control valve 102 to enter an open operational condition to allow high pressure CNG to enter the knock-out bottle 104 and raise the pressure inside the tank. When the pressure inside the knock-out bottle 104 rises to or above the high end of the range, the PID controller 116 may send a command message to the control valve 102 to enter a closed operational condition to stop the flow of high pressure CNG into the knock-out bottle 104.

Figure 2:
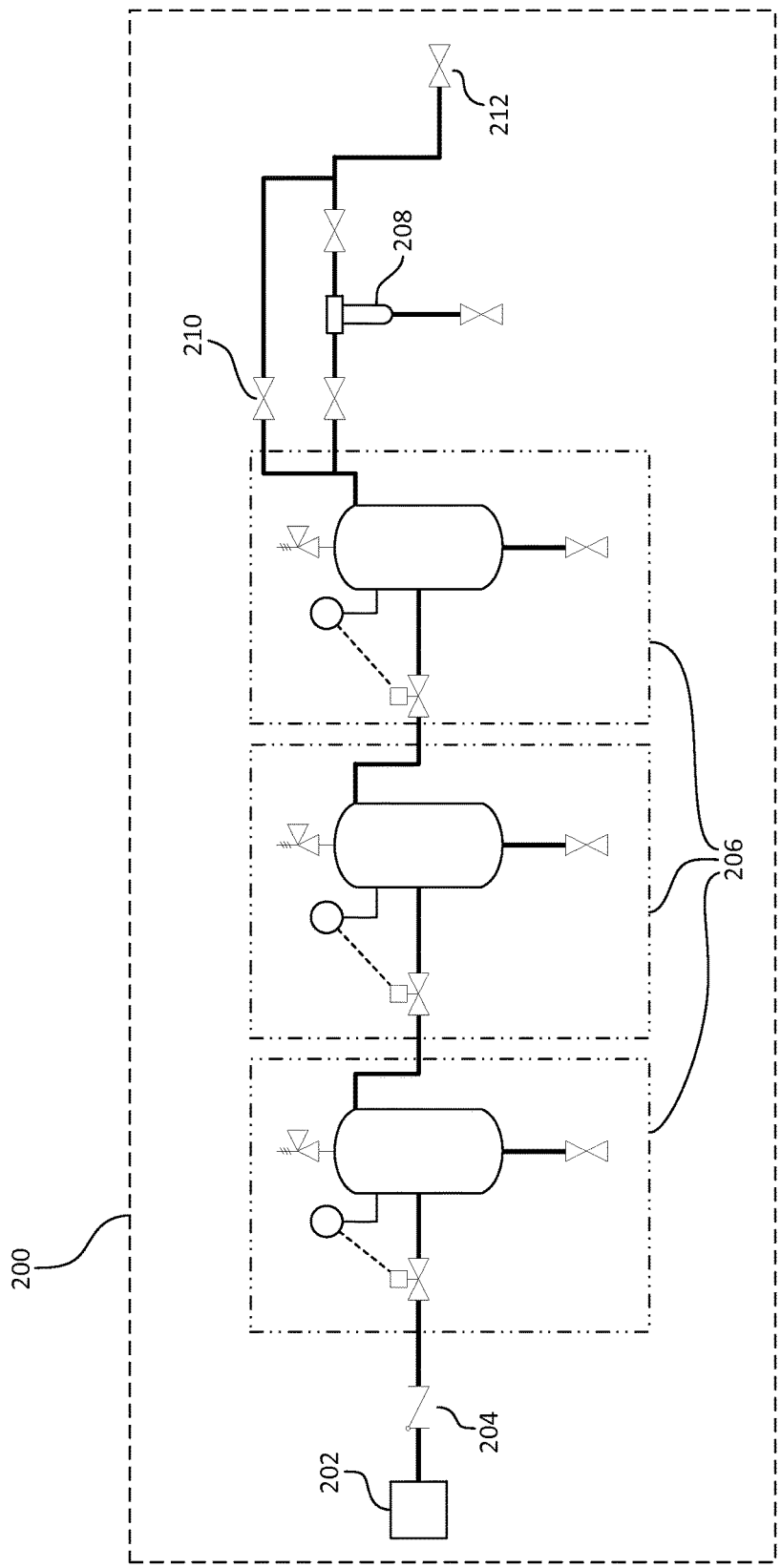
FIG. 2 is a diagram of an example pressure reduction stage in accordance with the present disclosure.

As described above, one or more pressure reduction stages 100 may be implemented in a pressure reducing system to depressurize a CNG gas stream without preheating or using pressure regulators. FIG. 2 is a diagram illustrating an example configuration of a PRS in accordance with the present disclosure. High pressure CNG is introduced into the PRS 200 through a high pressure gas inlet 202. In some embodiments, high pressure gas inlet 202 may be a connection with a compression station. In other embodiments, high pressure gas inlet 202 may be one or more tube trailers. In various embodiments, a combination of both a connection to the local gas utility's CNG transmission pipelines and tube trailers may make up the high pressure gas inlet 202.

In various embodiments, a valve 204 may be connected to the high pressure gas inlet 202. The type of valve employed may depend on the CNG system utilized. In various embodiments, the valve 204 may be one of: a check valve; a gate valve; a butterfly valve; a powered valve; a control valve; a diaphragm valve; a ball valve; a plug valve; or any other valve suitable for high pressure flows to pass through.

In the illustrated example PRS 200 of FIG. 2, three (3) pressure reduction stages 206 are implemented to reduce the pressure of the CNG stream. In some embodiments, as few as one pressure reduction stage 206 may be implemented in a PRS 200 in accordance with the present disclosure. In various embodiments, more than one pressure reduction stage 206 may be implemented. The greater number of pressure reduction stages 206 implemented within the PRS 200, the more gradual a step down in pressure can be achieved. The number of pressure reduction stages 206 implemented may depend on the design of the CNG system in which the PRS 200 may be implemented.

When more than one pressure reduction stage 206 is implemented, the pressure range of each knock-out bottle of the respective pressure reduction stages may be different. In some embodiments, the pressure range of each pressure reduction stage 206 is lower than the pressure range of the preceding pressure reduction stage 206. Using the example PRS 200 of FIG. 2, if the pressure of the CNG entering the PRS 200 via the high pressure gas inlet 202 is 4,000 psig, the pressure within the knock-out bottle of the first pressure reduction stage may be maintained between 1,500-2,500 psig, the pressure within the knock-out bottle of the second pressure reduction stage may be maintained between 500-1,500 psig, and the pressure within the knock-out bottle of the third pressure reduction stage may be maintained between 25-100 psig. Accordingly, the CNG leaving the third pressure reduction stage would be between 25 and 100 psig. In other embodiments, the CNG leaving the final pressure reduction stage can be designed to be any operational pressure necessary for the end-user equipment. In some embodiments, additional pressure reduction components may be connected to the output of the final pressure reduction stage to further reduce the CNG pressure to usable levels. In some embodiments, a final filter 208 may be connected to the output of the final pressure reduction stage to further remove left over contaminants and solids from the CNG. In some embodiments, additional valves 210 may be connected to the output of the final pressure reduction stage to provide additional flow control. In some embodiments, one or more of flow meters, heaters, and regulators may be connected to the outlet of the final pressure reduction stage, to provide additional control to the PRS 200 operator.

Figure 3:
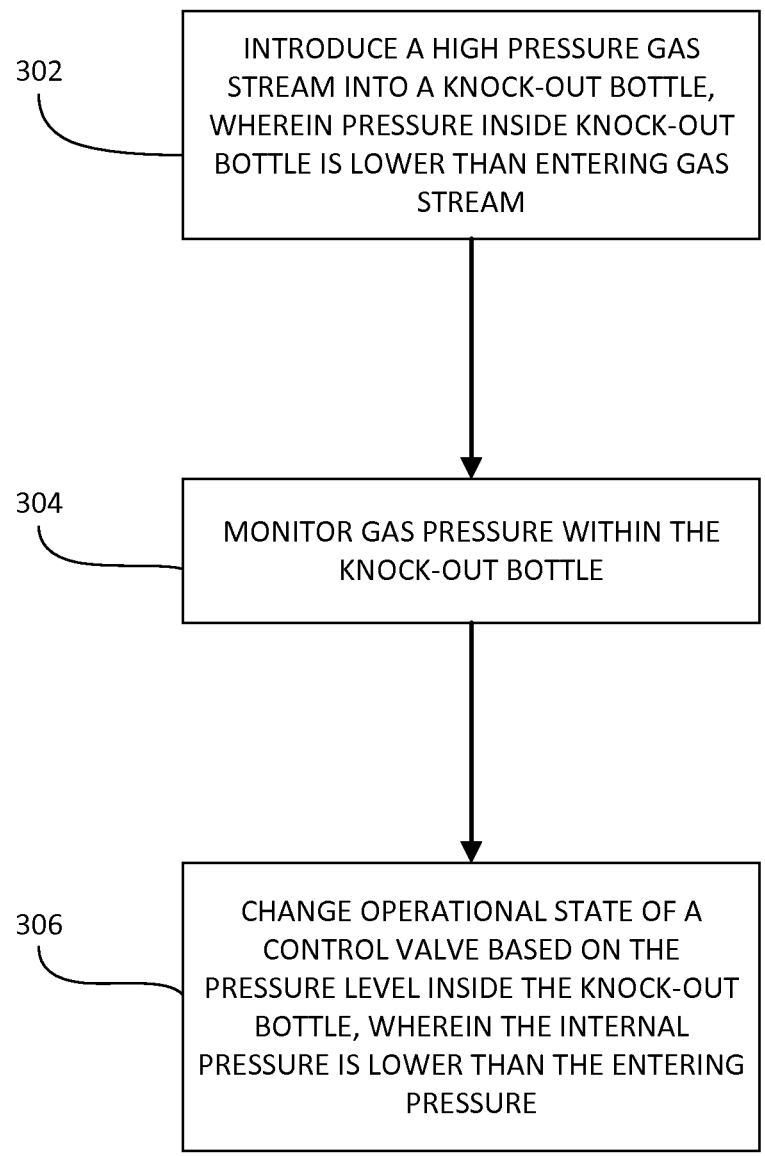
FIG. 3 is a flow diagram of an example method of reducing the pressure of a pressurized gas in accordance with the present disclosure.

Once the CNG passes through the final pressure reduction stage, and any additional components attached to the output of the final pressure reduction stage, the CNG passes through a low pressure gas outlet 212. At this stage, the CNG should be at the pressure level necessary for the intended purposes. Where the PRS 200 is utilized to depressurize CNG for direct feed of usable CNG to an end-user, such as a natural gas service to a home, the pressure level of the CNG at the low pressure gas outlet 212 should be appropriate for use by the end-user equipment, such as a power generator, boiler, stove or heater. Where the PRS 200 is implemented at a CNG gas fueling station, the PRS 200 could be used to lower the pressure of the CNG being delivered by a local gas utility, via either a main pipeline or tube trailers, prior to being compressed by an on-site compressor for CNG storage. In various embodiments, the low pressure gas outlet 212 may be a valve. The type of valve employed may depend on the CNG system utilized. In various embodiments, the low pressure gas outlet 212 may be one of: a check valve; a gate valve; a butterfly valve; a powered valve; a control valve; a diaphragm valve; a ball valve; a plug valve; or any other valve suitable for high pressure flows to pass through FIG. 3 is a flow diagram of an example method of reducing the pressure of a pressurized gas in accordance with the present disclosure. At 302, a gas stream is introduced into a knock-out bottle. The gas stream enters the knock-out bottle via a control valve. In some embodiments, the control valve may have two operational positions: a closed position and an open position. In other embodiments, the control valve may be capable of more than two operational positions: a closed position; a half-open position; and an open position. In some embodiments, the gas stream is a high pressure CNG stream. The CNG stream may be introduced via a high pressure gas inlet, similar to the high pressure gas inlet described above with regards to FIG. 2. In some embodiments, the gas stream may be a highly pressured gaseous mixture, such as compressed air.

At 304, the pressure within the knock-out bottle is monitored. The pressure within the knock-out bottle is held at a lower pressure than the pressure of the gas stream entering the knock-out bottle. In some embodiments, the pressure within the knock-out bottle is measured via a pressure sensor. In some embodiments, the pressure sensor is monitored manually. In other embodiments, a PID controller, PLC, or other controller or feedback mechanism, is connected with to the pressure sensor.

At 306, a change in the operational state of the control valve is made, if the pressure within the knock-out bottle is not within a certain pressure range. When the pressure drops to or below the low end of the pressure rage, the operational state of the control valve can be changed to an open position to allow the higher pressure gas enter the knock-out bottle. In some embodiments, the operational state may be changed to either an open position or a half-opened position. When the pressure rises to or above the high end of the pressure range, the operational state of the control valve can be changed to a closed position to stop the flow of higher pressure gas into the knock-out bottle. In some embodiments, the operational state may be changed to either a closed position or a half-open position. If the pressure within the knock-out bottle is within the pressure range, no change in the operational state of the control valve may be necessary. In some embodiments, the operational state of the control valve may be manually changed. In other embodiments, the operational state of the control valve may be changed by a PID controller or other feedback mechanism.

In such cases, the PID controller or other feedback mechanism can send the appropriate command message to the control valve based on the change of the pressure within the knock-out bottle.

Although the technology disclosed herein is described in regards of compressed natural gas (CNG), the technology is applicable in any field where the pressure of a gas stream must be lowered in order to be usable. The disclosure should not be read to limit in anyway the applicability of the present technology to only the CNG industry.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A system, comprising:
   a gas stream inlet for introducing a pressurized gas stream at an initial pressure level;
   a gas stream outlet; and
   a pressure reduction stage, comprising:
      a knock-out bottle;
      a control valve connected to the gas stream inlet and configured to introduce the pressurized gas stream into the knock-out bottle;
      a pressure sensor, wherein the pressure sensor monitors the gas pressure within the knock-out bottle and controls the control valve;
      an output connected to the gas stream outlet;
   wherein the pressure sensor places the control valve in an open position when the gas pressure within the knock-out bottle is at or below a first pressure level, and places the control valve in a closed position when the gas pressure within the knock-out bottle is at or above a second pressure level, wherein the pressure reduction stage, by way of batch processing gas flow, depressurizes the introduced pressurized gas stream to a lower pressure range comprising the first pressure level and the second pressure level; and
   a second pressure reduction stage, wherein the second pressure reduction stage is positioned between the output of the first pressure reduction stage and the gas stream outlet, wherein a gas stream exiting the outlet of the first pressure reduction stage is introduced into a knock-out bottle of the second pressure reduction stage through a control valve of the second pressure reduction stage;
   wherein a pressure sensor of the second pressure reduction stage places the control valve of the second pressure reduction stage in an open position when the gas pressure within a knock-out bottle of the second pressure reduction stage is at or below a third pressure level, and places the control valve in a closed position when the gas pressure within the knock-out bottle is at or above a fourth pressure level.

2. The system of claim 1, wherein the gas pressure of the gas stream leaving the pressure reduction stage is lower than the initial pressure level.

3. The system of claim 1, wherein the gas stream inlet comprises one or more high pressure gas connections.

4. The system of claim 1, the pressure reduction stage further comprising an emergency vent and a drainage port.

5. The system of claim 1, the pressure reduction stage further comprising a second pressure sensor, wherein the second pressure sensor also monitors the gas pressure within the knock-out bottle.

6. The system of claim 1, wherein the gas pressure of the gas stream leaving the second pressure reduction stage is lower than the gas stream leaving the first pressure reduction stage, which is lower than the initial pressure level.

7. The system of claim 1, wherein one or more of the first pressure reduction stage or the second pressure reduction stage further comprises a second pressure sensor, wherein the second pressure sensor monitors the gas pressure within the knock-out bottle.

8. The system of claim 1, further comprising:
a third pressure step down stage, wherein the third pressure reduction stage is positioned between the output of the second pressure reduction stage and the gas stream outlet; and
wherein the pressure sensor of the third pressure reduction stage places a control valve of the third pressure reduction stage in an open position when the gas pressure within a knock-out bottle of the third pressure reduction stage is at or below a fifth pressure level, and places the control valve in a closed position when the gas pressure within the knock-out bottle is at or above a sixth pressure level.

9. The system of claim 8, wherein the gas pressure of the gas stream leaving the third pressure reduction stage is lower than the gas stream leaving the second pressure reduction stage, which is lower than the gas stream leaving the first pressure reduction stage, which is lower than the initial pressure level.

10. The system of claim 8, wherein one or more of the first pressure reduction stage, the second pressure reduction stage, or the third pressure reduction stage further comprises a second pressure sensor, wherein the second pressure sensor monitors the gas pressure within the knock-out bottle.

11. A pressure reducing system, comprising:
a first pressure reducing stage, comprising:
a first control valve connected to a gas stream inlet;
a first knock-out bottle connected to the first control valve, the first control valve configured to introduce a gas stream at an initial pressure from the gas stream inlet into the knock-out bottle, the first knock-out bottle further having a first outlet; and
a first pressure sensor to monitor gas pressure within the first knock-out bottle and control an operational state of the first control valve to maintain the gas pressure within the first knock-out bottle within a first pressure range;
a second pressure reducing stage, comprising:
a second control valve connected to the first outlet;
a second knock-out bottle connected to the second control valve, the second control valve configured to introduce a gas stream at a pressure within a first pressure range into the second knock-out bottle, the second knock-out bottle further having a second outlet; and
a second pressure sensor to monitor gas pressure within the second knock-out bottle and control an operational state of the second control valve to maintain the gas pressure within the second knock-out bottle within a second pressure range;
a third pressure reducing stage, comprising:
a third control valve connected to the second outlet;
a third knock-out bottle connected to the third control valve, the third control valve configured to introduce a gas stream at a pressure within a second pressure range into the third knock-out bottle, the third knock-out bottle further having a third outlet; and
a third pressure sensor to monitor gas pressure within the third knock-out bottle and control an operational state of the third control valve to maintain the gas pressure within the third knock-out bottle within a third pressure range; and
an outlet connection connected to the third outlet;
wherein the third pressure range is lower than the second pressure range, the second pressure range is lower than the first pressure range, and the first pressure range is lower than the initial pressure.

12. The system of claim 11, further comprising more than three pressuring reducing stages.

* * * * *